Dec. 6, 1966    H. K. NOREN    3,289,945
THRUST REVERSER FOR PLUG NOZZLE
Filed Feb. 12, 1964    5 Sheets-Sheet 1
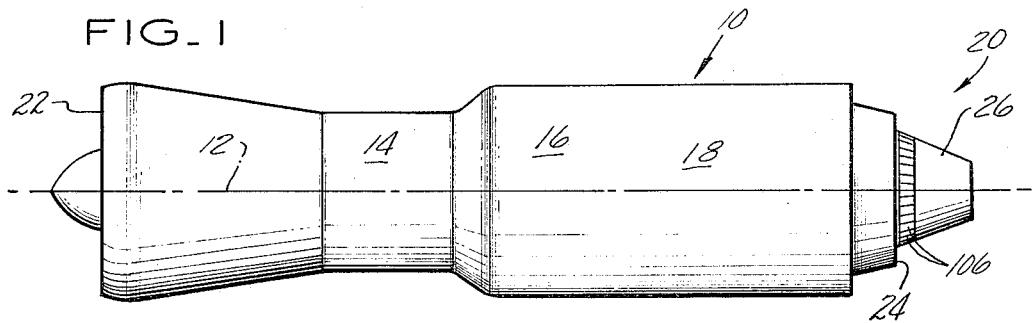
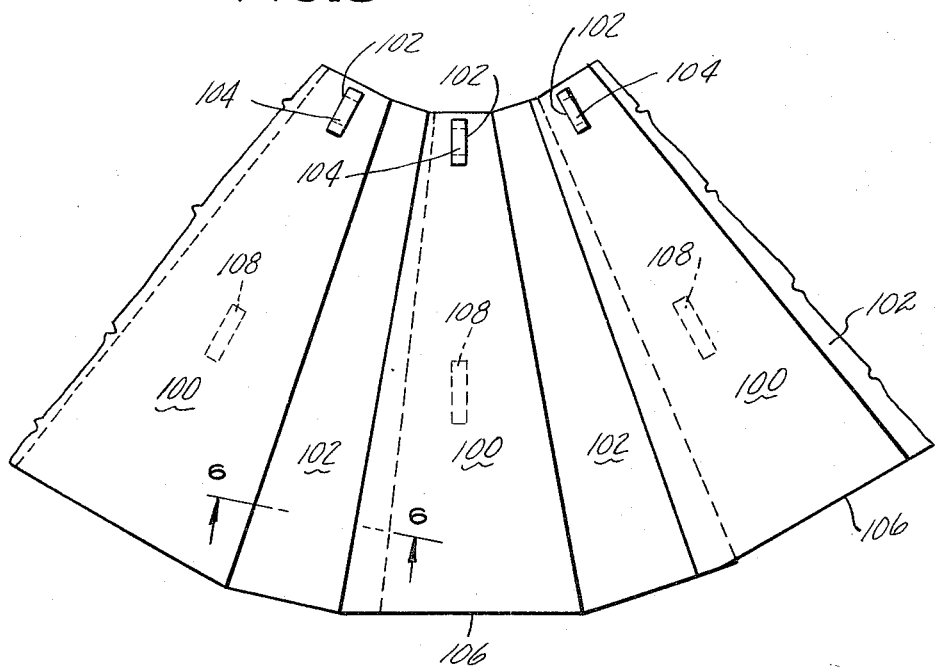
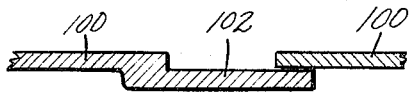
INVENTOR
HILMER K. NOREN
BY Vernon F. Hauschild
ATTORNEY

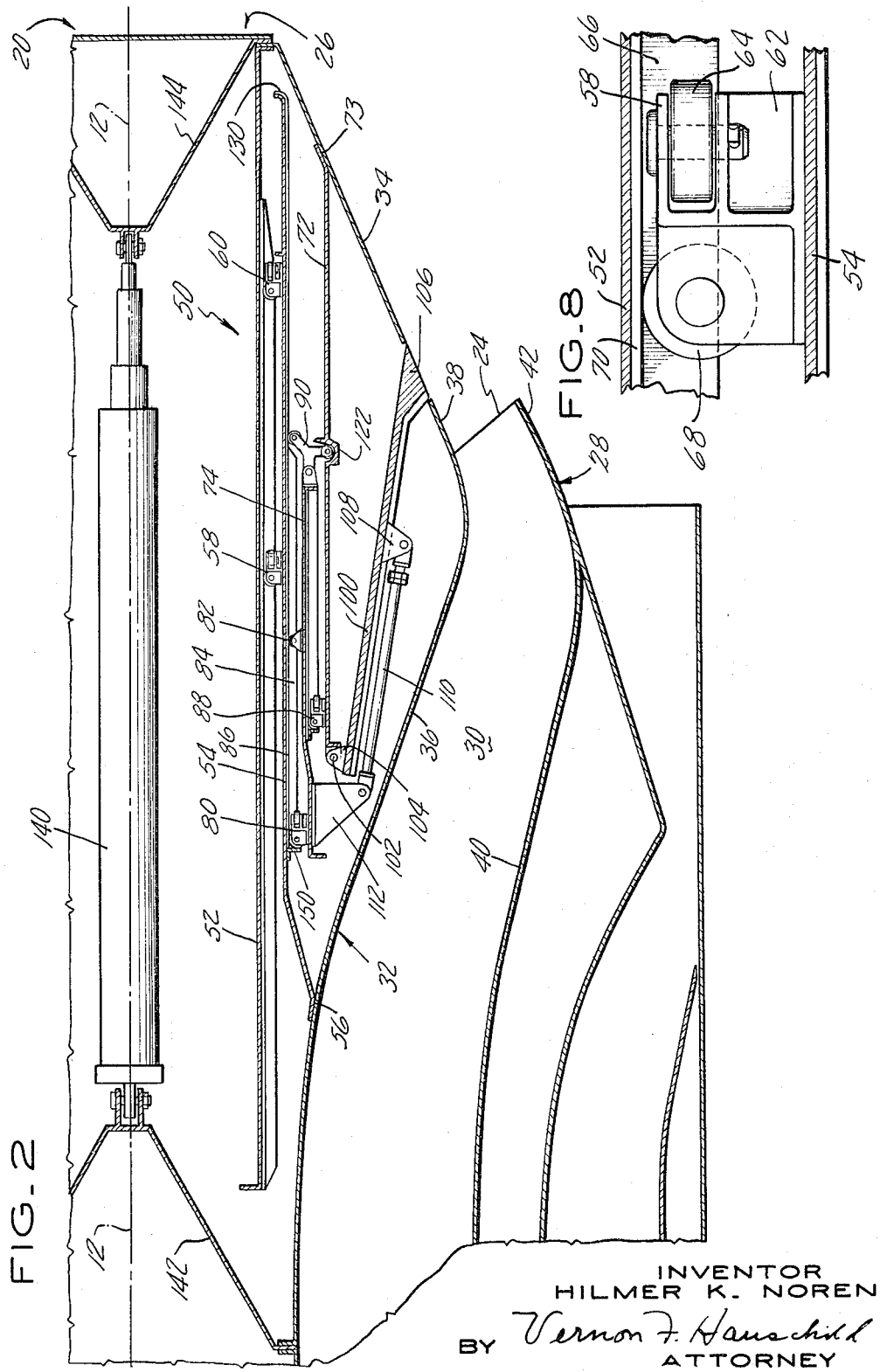

Dec. 6, 1966 H. K. NOREN 3,289,945
THRUST REVERSER FOR PLUG NOZZLE
Filed Feb. 12, 1964 5 Sheets-Sheet 3
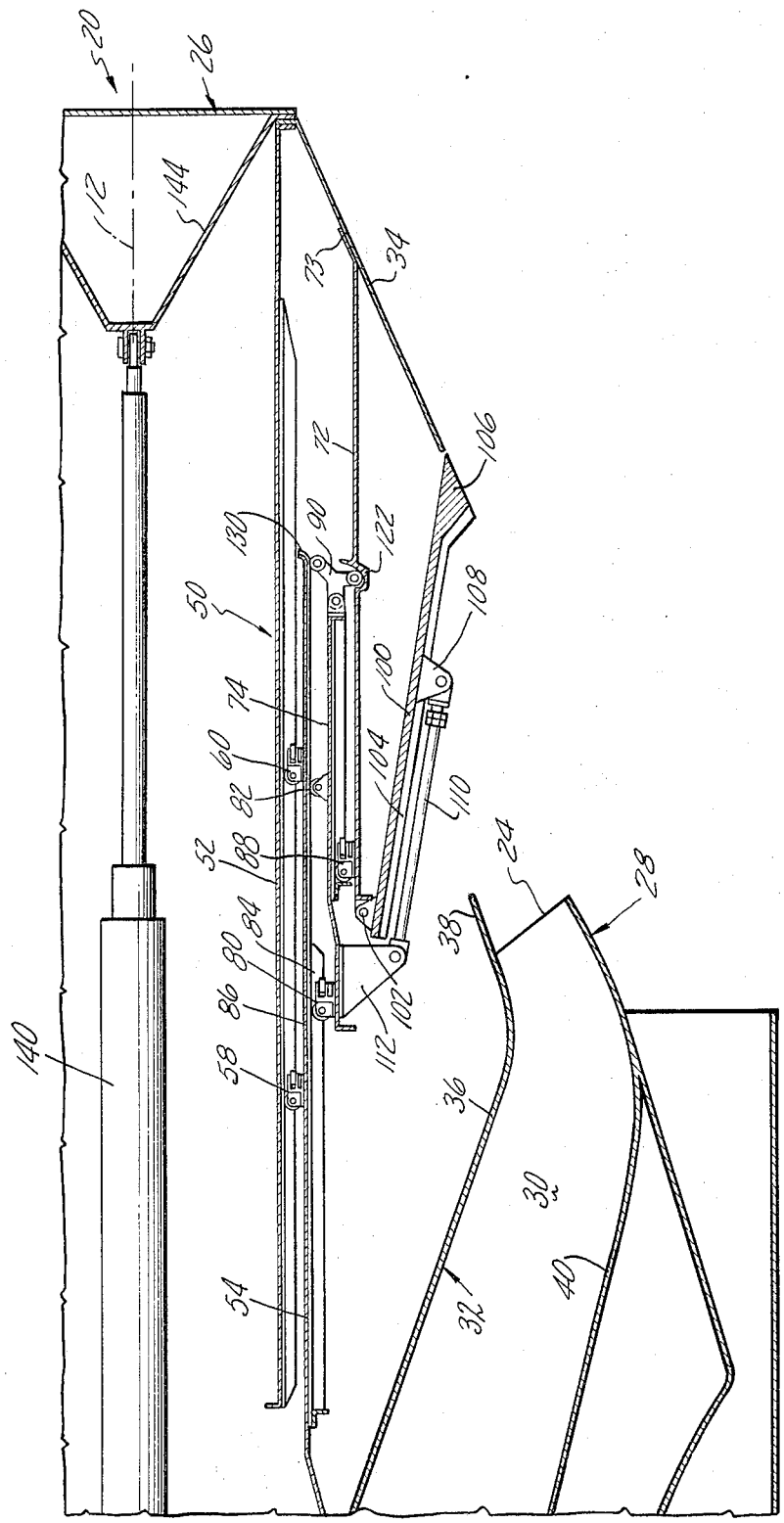
FIG_3

Dec. 6, 1966  H. K. NOREN  3,289,945
THRUST REVERSER FOR PLUG NOZZLE
Filed Feb. 12, 1964  5 Sheets-Sheet 4
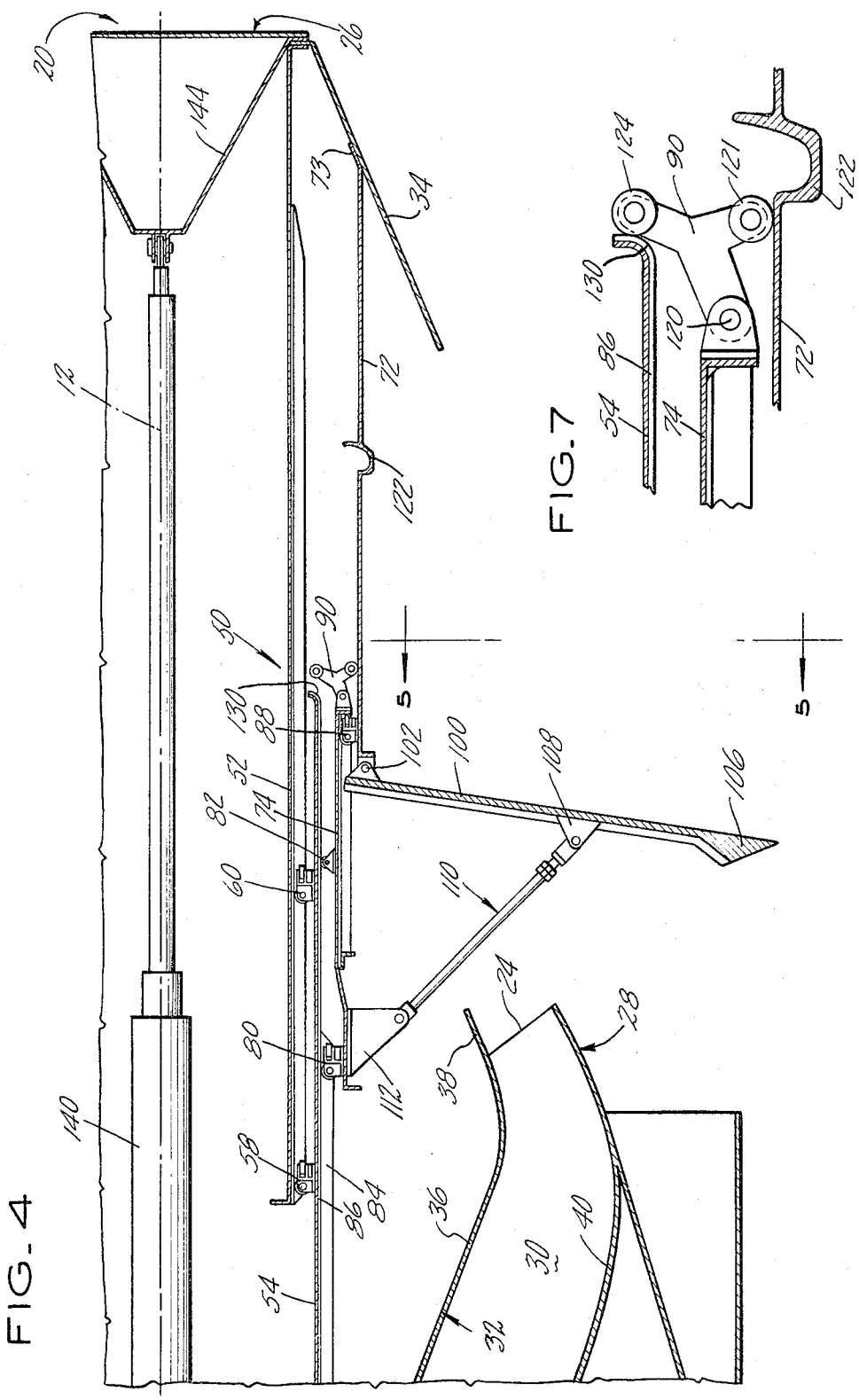

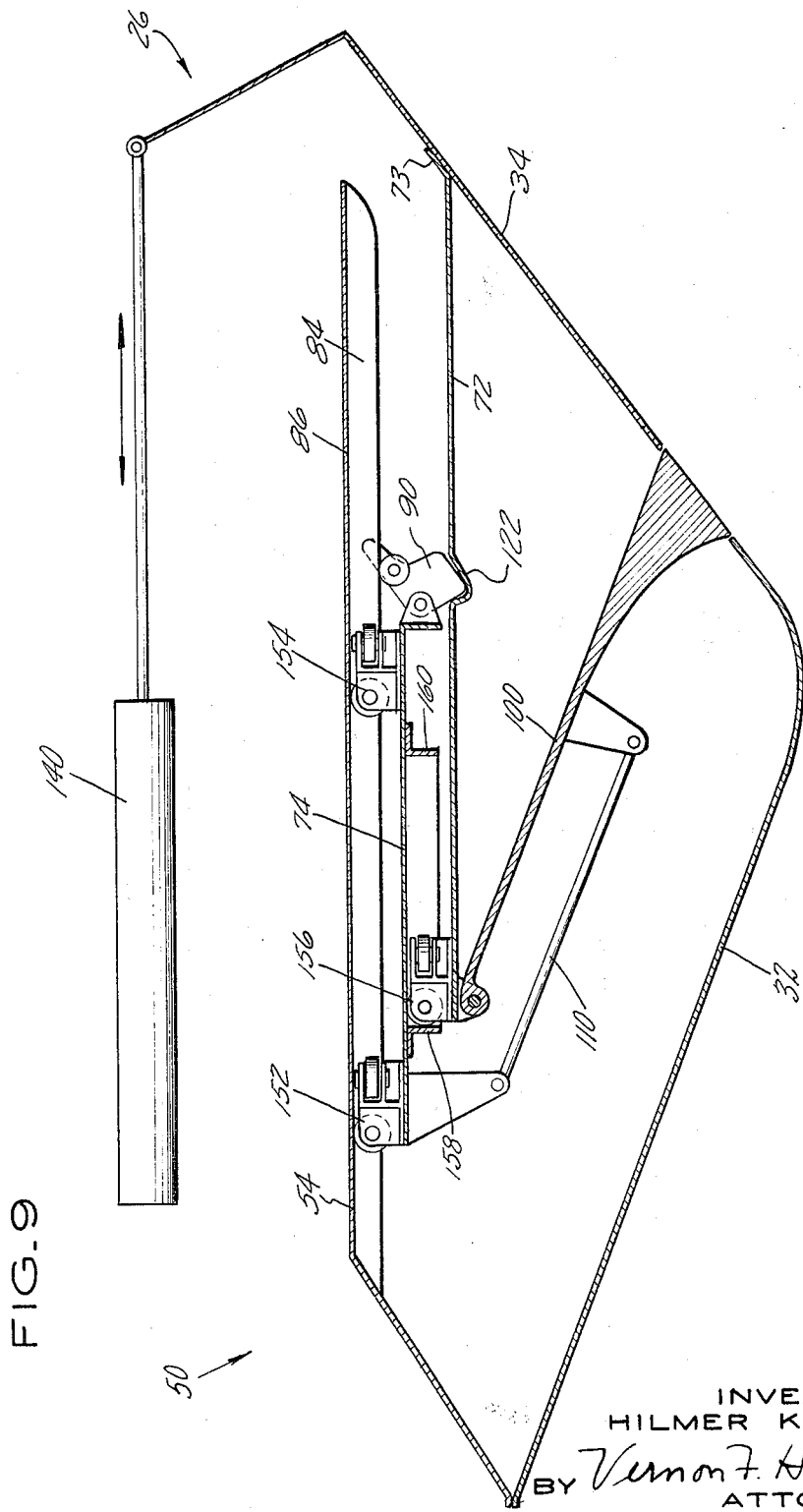

United States Patent Office 3,289,945
Patented Dec. 6, 1966

3,289,945
THRUST REVERSER FOR PLUG NOZZLE
Hilmer K. Noren, Manchester, Conn., assignor to United Aircraft Corporation, East Hartford, Conn., a corporation of Delaware
Filed Feb. 12, 1964, Ser. No. 344,482
6 Claims. (Cl. 239—265.19)

This invention relates to jet engine thrust reversers and more particularly for thrust reversers intended for use with jet propulsion flight vehicles adapted to operate in the supersonic speed range.

It is an object of this invention to teach a thrust reverser which operates between a stowed, intermediate and thrust reverser position and which presents no resistance to exhaust gas flow in its stowed position, which is easy to actuate into all three positions and which can be made to be fail safe to return to its stowed position if actuating pressure is lost.

It is a further object of this invention to teach a thrust reverser which is located in the center plug of an exhaust nozzle and which translates axially rearwardly into a thrust reverser position.

Other objects and advantages will be apparent from the specification and claims and from the accompanying drawings which illustrate an embodiment of the invention.

FIG. 1 is a side view of a conventional jet engine using my thrust reverser.

FIG. 2 is a cross section showing of my thrust reverser in its stowed position.

FIG. 3 is a cross section showing of my thrust reverser in its intermediate position.

FIG. 4 is a cross section showing of my thrust reverser in its thrust reverser position.

FIG. 5 is a rear view of my thrust reverser flaps showing their circumferential positioning and the innerflap seal extending between adjacent flaps.

FIG. 6 is a view taken along line 6—6 of FIG. 5.

FIG. 7 is an enlarged showing my roller-lock mechanism.

FIG. 8 is an enlarged showing of typical support rollers used with my thrust reverser.

FIG. 9 is a modification of my thrust reverser.

Referring to FIG. 1, we see thrust generating flight vehicle 10, which is illustrated as a conventional-turbojet engine, but it should be borne in mind that it could as well be any vehicle which generates thrust by discharging exhaust gases to atmosphere. Engine 10 is presumably of circular cross section and concentric about axis 12 and includes compressor section 14, burner section 16, turbine section 18 and exhaust nozzle 20, which may or may not be at the downstream end of a conventional afterburner.

In operation, air enters annular inlet 22 of engine 10 and is compressed in passing through compressor section 14. The compressed air has heat energy added thereto in passing through burner section 16 and has sufficient energy extracted therefrom to drive compressor 14 while passing through turbine 18. After passing through turbine 18, the exhaust gases may or may not be reheated in a conventional afterburner and are then discharged to atmosphere through exhaust outlet 24 and expand against center plug 26 to generate thrust. For a more particular description of the construction and operation of engine 10, reference may be had to U.S. Patent Nos. 2,711,631 and 2,747,367.

Referring to FIG. 2, we see my thrust reverser in its stowed or inoperative position clustered within center plug or cone 26. It will be noted that center cone 26 is enveloped within outer duct 28 and cooperates therewith to define annular gas passage 30 which decreases in cross-sectional area in a downstream direction.

Center plug 26 consists of fixed forward section 32 and axially translatable after section 34 which is spaced axially rearward of fixed section 32 when in the stowed FIG. 2 position. It will be noted that fixed section 32 diverges away from axis 12 at its forward portion 36 and converges toward axis 12 at its after portion 38. In the same fashion, outer duct 28 diverges away from axis 12 at its forward portion 40 and converges toward axis 12 at its after portion 42. In view of this construction of fixed center plug portion 32 and outer duct 28, it will be evident that annular exhaust passage 30 first diverges away from axis 12 and then converges theretoward before terminating in tipped throat 24.

Still referring to FIG. 2, we see that my thrust reverser mechanism 50 comprises movable after portion 34 of the center plug 26 and also comprises movable support sleeve 52 which is attached to and axially translatable with after portion 34 of center plug 26, and which is concentric about axis 12. My thrust reverser mechanism 50 further includes fixed sleeve 54 which is attached at flange 56 to the fixed forward portion 32 of center plug 26 and which is also concentric about axis 12. Fixed sleeve 54 carries a plurality of support rollers 58 and 60 which are axially spaced and circumferentially positioned thereabout. Support rollers 58 and 60, as best shown in FIG. 8, are positioned on support bosses 62 which are attached to fixed sleeve 54 and support boss 62 supports two rollers 64 which are positioned on opposite circumferential sides of runner 66, which extends radially outwardly from movable sleeve 52, and also supports two rollers 68 which are located on opposite circumferential sides of runner 66 and which bear against axially extending runner 70, which is attached to movable sleeve 52. In this fashion, roller supports 58 and 60 support movable sleeve 52 from fixed sleeve 54 and permit relative axial motion therebetween.

My thrust reverser 50 further includes first axially translatable member 72, which is attached to movable portion 34 of center plug 26 at flange 73 and moves therewith and second axially translatable member 74. Axially translatable members 72 and 74 are basically sleeves concentric about axis 12. Roller supports 80 and 82 are supported on second axially translatable member 74 and engage runners 84 and/or 86, which are supported from fixed sleeve 54. Rollers 80 and 82 are of conventional design and may be of the type illustrated more fully in FIG. 8. Rollers 80 and 82 serve to support second axially translatable member 74 from fixed sleeve 54 and permit relative axial translation therebetween.

Roller support 88, which may be of the type disclosed in FIG. 8, together with special lock-roller 90, which is to be described in greater particularly hereinafter, serves to assist in supporting first and second axially translatable members 72 and 74 with respect to one another and with respect to fixed sleeve 54 and also serves to lock axially translatable members 72 and 74 together during a portion of their translation.

A plurality of circumferentially positioned flaps 100 are pivotally attached to the forward end of first movable member 74 at pivot point 102. As best shown in FIGS. 5 and 6, flaps 100 are circumferentially positioned about axis 12 and each has attached thereto, integrally or otherwise, innerflap seal 102. Innerflap seal 102 extends circumferentially from each flap 100 and overlaps the adjacent flap 100 in all flap positions. It will be noted that both flaps 100 are innerflap seals 102 are tapered so as to be narrower at their inner ends 104 closest to axis 12 than at their outer ends 106 farthest therefrom. Flaps 100 are wedge shaped at their outer end 106 and this wedge shape outer end 106 is positioned between fixed portion 32 and movable portion 34 of center plug 26 when in the FIG. 1 stowed position and cooperates therewith to define a smooth convergent conical surface. This same wedge shape end 106 cooperates with outer duct 28 in the thrust reverser or FIG. 4 position to assist in redirecting the flow of the exhaust gases.

Pivot brackets 108 are attached to flaps 100 somewhere between ends 104 and 106 and expandable links 110 are pivotally attached at one of their ends to flap 100 at pivot support 108 and at their opposite ends to pivot support 112, which extends from second axially translatable member 74. It will accordingly be seen that flaps 100 are pivotally attached to first axially translatable member 74 and that links 110 are pivotally attached at their opposite ends to flaps 100 and pivot supports 112 so that as relative axial translation takes place between axially translatable members 72 and 74 flaps 100 will pivot inwardly or outwardly radially between their FIG. 2 stowed position and their FIG. 4 thrust reverser position.

By proper positioning of pivot brackets 108 along flap 100, the flaps may be cause to return to the stowed position should ram 140 actuation pressure fail.

FIG. 7 best illustrates the operation of lock-roller 90. Lock-roller 90 is pivotally attached at 120 to second axially translatable member 74 and, as best shown in FIGS. 2 and 3, and roller 121 thereof, is received in the recess of detent member 122 of first axially translatable member 72. The opposite end of lock-roller 90 carries roller 124 which, as best shown in FIGS. 2 and 3, bears against roller 86 of fixed member 54 so as to retain lock member 90 and roller 121 in detent 122, thereby locking axially moving members 72 and 74 so that they must axially translate in unison when so locked. When roller 124 of lock-roller 90 is translated rearwardly to the after end 130 of fixed sleeve 54, roller 124 may move radially inwardly toward axis 12 due to the urging of detent member 122 which is being pulled axially rearwardly with first axially movable member 72 and the center plug movable portion 34. It will be obvious that with lock-roller 90 in its FIG. 7 position, movable members 72 and 74 are unlocked or disengaged and relative axial motion or translation therebetween is possible.

Hydraulic or pneumatic ram 140 is connected to the fixed portion 32 of center plug 26 by support member 142 and is attached pivotally, through support member 144 to the center plug movable after portion 34. Ram 140 consists of the conventional piston within a cylinder, which piston is caused to translate axially rearwardly or forwardly by admitting compressed fluid, for example from compressor section 14, to the opposite sides thereof.

Operation

In operation, thrust reverser 50 operates between the FIG. 2 stowed position and the FIG. 4 thrust reverser or operationable position, passing through the FIG. 3 intermediate position in both directions.

With the thrust reverser in its FIG. 2 stowed position actuating fluid is provided to ram 140, which expands and causes movable portion 34 of center plug 26 to translate axially rearwardly. Since first movable member 72 is attached to movable section 34 of center body 26 at flange 73, first movable member 72 translates rearwardly with center cone movable section 34. Additionally, since lock-roller 90 is serving to lock second movable member 74 to first movable member 72, second movable member 74 translates axially rearwardly with members 72 and 34. This axially rearward translation of members 34, 72 and 74 continues until lock-roller 90 reaches its FIG. 3 intermediate position. It will be noted by observing FIGS. 2 and 3 that flaps 100 and links 110 have remained in their retracted position throughtout this first portion of axial rearward motion.

When thrust reverser 50 reaches the FIG. 3 intermediate position, lock-roller 90 assumes its FIG. 7 unlocked position, thereby permitting center plug section 34 and first movable member 72 to continue to translate axially rearwardly while second movable member 74 remains stationary since it is not being pulled rearwardly by first movable member 72. There is accordingly relative translation between members 72 and 74 as thrust reverser 50 moves between its FIG. 3 intermediate position and its FIG. 4 thrust reverser position, and accordingly flaps 100 pivot radially outwardly between their FIG. 3 and FIG. 4 positions during the second and remaining portion of the axial rearward translation of members 34 and 72. When my thrust reverser 50 has reached its FIG. 4 thrust reverser position, it will be noted that flaps 100 are positioned downstream of exhaust gas passage 30 and extend thereacross to cause the exhaust gas passing therefrom to be discharged in a reverse direction, primarily due to the cooperation between outer duct 28 and flap wedge shape end 106.

When thrust reverser operation is no longer desired, the hydraulic ram 140 is caused to contract axially, thereby causing center plug movable member 34 and first axially translatable member 72 to translate axially forward from the FIG. 4 thrust reverser position to the FIG. 3 intermediate position. At the FIG. 3 position, lock-roller 90 again locks first and second axially translatable members 72 and 74 together. Due to this relative motion between members 72 and 74, flaps 100 have been caused to pivot radially inwardly to their FIG. 3 intermediate position. As ram 140 is caused to contract further, members 34 and 72 and 74 move from the FIG. 3 intermediate position to the FIG. 2 stowed position, thereby returning engine 10 to its normal operating position. With thrust reverser 50 in its stowed position, roller support 80 contacts positive stop 150.

A simplified embodiment of my thrust reverser 50 is shown in FIG. 9 wherein the same reference numerals as used in FIGS. 2–4 are again used. In FIG. 9, it will be noted that fixed sleeve support 54 again extends from fixed center plug member 32 and first movable member 72 is attached to movable center plug section 34 through flange 73. Second movable member 74 is normally locked to first movable member 72 by lock-roller 90, which is received in detent of 122 of member 72. Support rollers 152 and 154 support second movable member 74 from fixed sleeve 54 while support roller 156, which operates between positive stops 158 and 160, cooperated with lock-roller 90 to support first movable member 72 from second movable member 74. It will be obvious to those skilled in the art that the FIG. 9 construction differs from the FIGS. 2–4 construction in the simplified support construction only and that the operation thereof is identical.

It is to be understood that the invention is not limited to the specific embodiment herein illustrated and described but may be used in other ways without departure from its spirit as defined by the following claims.

I claim:

1. A thrust reverser for a flight vehicle having an axis and which generates thrust by discharging exhaust gases to atmosphere comprising a center plug having an axially translatable after end, a fixed support sleeve located within and supporting said center plug, an outer duct enveloping said center plug to define an exhaust gas passage therebetween and an exhaust gas outlet therewith, thrust reverser mechanism enveloping and supported by said fixed support sleeve and enveloped within said center plug when in a stowed position and comprising a first axially translatable sleeve concentric with said fixed support sleeve and attached to said center plug after end, a second axially translatable sleeve concentric with said fixed support sleeve and said first sleeve, at least one thrust reverser flap pivotally attached to said first and second axially translatable sleeves so that said flaps pivot radially as relative translation occurs between said first and second sleeves, and means to axially translate said center plug after end and said first and second axially translatable sleeves rearwardly to a first position and then to axially translate said center plug after end and said first sleeve rearwardly to a thrust reverser operative position whereby said flap pivots radially outward to extend across said exhaust gas passage rearward of said exhaust gas outlet to block and redirect exhaust gases.

2. A thrust reverser for a flight vehicle having an axis and which generates thrust by discharging exhaust gases to atmosphere comprising a center plug having an axially translatable after end, an outer duct enveloping said center plug to define an exhaust gas passage therebetween and an exhaust gas outlet therewith, thrust reverser mechanism enveloped within said center plug when in a stowed position and comprising first axially translatable means attached to said center plug after end, second axially translatable means normally engaged to said first axially translatable means through mechanical locking means, at least one thrust reverser flap pivotally attached to said first and second axially translatable means so that said flaps pivot radially as relative translation occurs between said first and second means, and means to axially translate said center plug after end and said first and second axially translatable means rearwardly to a first position at which said locking means automatically disengages and then to axially translate said center plug after end and said first means rearwardly to a thrust reverser operative position whereby said flap pivots radially outward to extend across said exhaust gas passage rearward of said exhaust gas outlet to block and redirect exhaust gases.

3. A thrust reverser for a flight vehicle having an axis and which generates thrust by discharging exhaust gases to atmosphere comprising a center plug having an axially translatable after end, and outer duct enveloping said center plug to define an exhaust gas passage therebetween and an exhaust gas outlet therewith, thrust reverse mechanism including flap means enveloped within said center plug when in a stowed position and comprising first axially translatable means attached to said center plug after end, second axially translatable means normally engaged to said first axially translatable means through mechanical locking means, said flap means including at least one thrust reverser flap pivotally attached to said first and second axially translatable means so that said flaps pivot radially as relative translation occurs between said first and second means, and means to axially translate said center plug after end and said first and second axially translatable means so normally engaged rearwardly to a first position at which said locking means automatically disengages and then to axially translate said center plug after end and said first means rearwardly to a thrust reverser operative position whereby said flap pivots radially to extend across said exhaust gas passage rearward of said exhaust gas outlet to block and redirect exhaust gases, and then to axially translate said center plug after end and said first means forwardly to said first position at which said locking means automatically reengages and whereby said flap pivots radially inwardly, and then to axially translate said center plug after end and said first and second means forwardly to said stowed position.

4. Apparatus according to claim 2 and wherein said center plug has an outer surface and includes a fixed forward end and wherein said at least one flap is a plurality of circumferentially extending flaps pivotally attached to said first and second means and with each flap having a wedge shaped outer end so shaped to be positioned between said center body forward and after ends when in said stowed position and cooperating therewith to form said center plug outer surface and further being so shaped to cooperate with said outer duct to cause a reversal of flow of the exhaust gases when in said thrust reversal position.

5. Apparatus according to claim 4 and wherein said means to axially translate said center plug and said first and second axially translatable means comprises a single piston-cylinder arrangement and further wherein the inner end of said flaps are pivotally attached to said first means, and including a plurality of links each pivotally attached at one end to said second means and each pivotally attached at the other end to one of said flaps at a location between said inner and outer ends.

6. A jet engine thrust reverser concentric about an axis and operable between a stowed and a thrust reverser position including an outer duct and a center plug therewithin defining an annular exhaust gas passage therebetween and terminating in an exhaust gas outlet, said center plug including a forward fixed section which diverges away from said axis at its forward end and diverges toward said axis at its after end, said center plug also including an axially translatable after section which is actuatable between a forward stowed position and an after thrust reverser position, said movable after section being spaced rearwardly from said fixed forward section when in said stowed position, said outer duct being shaped to diverge away from said axis at a forward portion and to converge toward said axis at an after portion so as to cooperate with said center plug fixed section to define an exhaust gas passage which diminishes in cross-sectional area in a downstream direction and which diverges away from said axis at a forward portion and converges toward said axis at its downstream end and terminating in said exhaust gas outlet which defines a tipped throat with said center plug fixed section, a first axially translatable sleeve attached to said center plug after section and enveloped within said center plug, a second axially translatable sleeve enveloped within said center plug and concentric with respect to said first sleeve, a fixed sleeve attached to said center plug and enveloped therewithin and positioned concentrically with respect to said first and second axially translatable sleeves, roller means supporting said first and second axially translatable sleeves for axial translation with respect to one another and with respect to said fixed sleeve, a plurality of circumferentially positioned flaps pivotally attached at one end to the forward end of said first axially translatable sleeve and extending rearwardly therefrom when in said stowed position, said flap being wedge-shaped at their after ends such that one face of said wedge-shaped after end is positioned between said fixed and said axially translatable sections of said center plug when in said stowed position to cooperate therewith in defining a smooth convergent surface, interflap seals extending between adjacent flaps, a plurality of links pivotally attached to the forward end of said second axially translatable sleeve at one of their ends and pivotally attached to one of said flaps at a position between said flap forward and after ends at the other of their ends, means locking said first and second axially translatable sleeves when in said stowed position, means to axially translate said central plug after end and said first and second axially translatable sleeves in a rearward direction to a position intermediate said stowed and said thrust reverser position, means to unlock said first and second axially translatable sleeves when at said intermediate position, means to axially translate said center plug after section and said first sleeve rearwardly between said intermediate and said thrust reverser positions thereby causing said flaps to pivot radially outwardly to extend across said exhaust gas passage downstream of said outlet, said outer duct and said wedge-shaped after end of said flaps being so shaped so as to reverse the direction of flow of said exhaust gas downstream of said outlet when the thrust reverser is in said thrust reverser position.

References Cited by the Examiner

UNITED STATES PATENTS

| | | | |
|---|---|---|---|
| 2,803,944 | 8/1957 | Kroon | 60—35.54 |
| 2,938,335 | 5/1960 | Cook | 60—35.54 |
| 3,013,751 | 12/1961 | Scott et al. | 60—35.54 X |
| 3,036,431 | 5/1962 | Vdolek | 60—35.54 |
| 3,059,426 | 10/1962 | Laucher et al. | 60—35.54 |

MARK NEWMAN, *Primary Examiner.*

A. L. SMITH, *Assistant Examiner.*

UNITED STATES PATENT OFFICE
CERTIFICATE OF CORRECTION

Patent No. 3,289,945                                  December 6, 1966

Hilmer K. Noren

It is hereby certified that error appears in the above numbered patent requiring correction and that the said Letters Patent should read as corrected below.

Column 5, line 31, for "reverse" read -- reverser --; column 6, line 2, after "said" insert -- flap --; line 37, for "flap" read -- flaps --.

Signed and sealed this 19th day of September 1967.

(SEAL)
Attest:

ERNEST W. SWIDER                          EDWARD J. BRENNER
Attesting Officer                              Commissioner of Patents